United States Patent [19]

Nomura et al.

[11] Patent Number: 4,610,903
[45] Date of Patent: Sep. 9, 1986

[54] MAGNETO-OPTICAL DISK MEMORY

[75] Inventors: Masaaki Nomura; Akira Nahara; Tatsuji Kitamoto, all of Odawara, Japan

[73] Assignee: Fuji Photo Film Co., Ltd., Tokyo, Japan

[21] Appl. No.: 687,300

[22] Filed: Dec. 28, 1984

[30] Foreign Application Priority Data

Jan. 6, 1984 [JP] Japan .................................. 59-650

[51] Int. Cl.⁴ .................................................. G11B 7/24
[52] U.S. Cl. ...................................... 428/64; 360/135; 428/332; 428/338; 428/694; 428/900
[58] Field of Search ................ 428/694, 900, 64, 332, 428/338; 365/122; 360/131, 135; 430/945

[56] References Cited

U.S. PATENT DOCUMENTS

| | | | |
|---|---|---|---|
| 3,816,237 | 6/1974 | Barrall et al. ........................ 161/227 |
| 4,310,919 | 1/1982 | Slater ................................... 430/945 |
| 4,390,600 | 6/1983 | Ohta et al. ........................... 428/900 |
| 4,450,553 | 5/1984 | Holster et al. ...................... 369/286 |
| 4,489,139 | 12/1984 | Ohta et al. ......................... 428/900 |

FOREIGN PATENT DOCUMENTS 169238 12/1981 Japan .

Primary Examiner—George F. Lesmes
Assistant Examiner—William M. Atkinson
Attorney, Agent, or Firm—Pasquale A. Razzano

[57] ABSTRACT

A magneto-optical disk memory comprises a magneto-optical recording medium constituted by a flexible substrate, and a recording thin film overlaid on the substrate. The recording thin film is fabricated of an amorphous rare-earth transition metal alloy having the easy axis of magnetization normal to the film surface. The magneto-optical recording medium is sandwiched between two hard supporting disks.

4 Claims, 2 Drawing Figures

F I G. 1
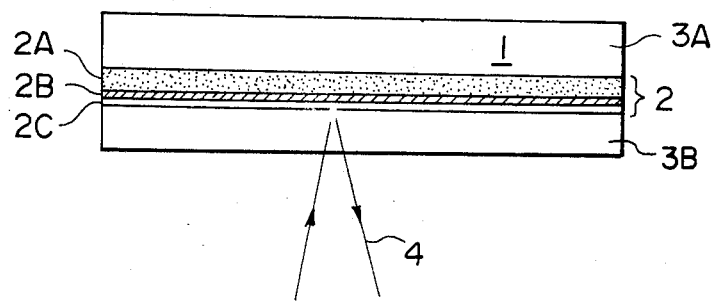
F I G. 2
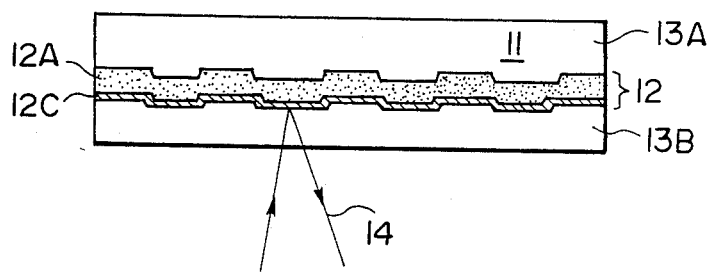

MAGNETO-OPTICAL DISK MEMORY

BACKGROUND OF THE INVENTION

1. Field of the Invention

This invention relates to a magneto-optical disk memory using a magnetic thin film recording medium wherein recorded information can be detected by use of a magneto-optical effect such as a magneto-optical Kerr effect or a Faraday effect.

2. Description of the Prior Art

There have heretofore been known magneto-optical recording media wherein information is recorded by changing a magnetic field and the recorded information is detected on the basis of a magneto-optical effect such as a magneto-optical Kerr effect or the Faraday effect.

The magneto-optical recording media are fabricated by overlaying a thin film of an amorphous magnetic alloy such as Gd-Co, Gd-Fe, Tb-Fe, Gd-Tb-Fe, or Tb-Fe-Co, on a non-flexible hard substrate made of glass, polymethyl methacrylate (PMMA), or polycarbonate (PC). The hard disks thus fabricated are considered excellent as high-density recording media wherein the recorded information is erasable.

However, when the magneto-optical disk memories are fabricated, the substrates of glass or the like formed in advance in a final shape must be cleaned and thin films must be overlaid on the substrates one by one by use of a batch type sputtering apparatus or a deposition apparatus. Therefore, the conventional magneto-optical disk memories are not suitable for mass production. Particularly, when a plurality of thin layers such as a substrate treatment layer, a reflecting layer, a dielectric layer, and a protective layer are overlaid on the substrate or when the thin layer is grooved for facilitating tracking control or addressing, the productivity of the magneto-optical disk memory is low, and the manufacturing cost becomes high.

SUMMARY OF THE INVENTION

The primary object of the present invention is to provide a magneto-optical disk memory which is fabricated with high productivity and at a low cost.

Another object of the present invention is to provide a magneto-optical disk memory which is easy to fabricate and exhibits excellent magneto-optical characteristics.

The present invention provides a magneto-optical disk memory comprising:

(i) a magneto-optical recording medium comprising a flexible substrate, and a recording thin film overlaid on said substrate, said recording thin film being constituted by an amorphous rare-earth transition metal alloy having the easy axis of magnetization normal to the film surface, and (ii) two hard supporting disks contacted closely with the front surface and the back surface of said magneto-optical recording medium.

In an embodiment of the present invention, the thickness of the substrate is 20 μm or less, and grooved hard supporting disks are press-fitted to the magneto-optical recording medium in a vacuum.

In another embodiment of the present invention, a magneto-optical recording medium comprising a reflecting metal film positioned between the substrate and the recording thin film is used.

The term "flexible substrate" as used herein embraces in its scope all flexible materials such as plastic films of polyethylene terephthalate, polyimide or the like. Among the flexible materials, those exhibiting a glass transition temperature of 70° C. or higher should preferably be used because of their excellent surface smoothness.

In the magneto-optical recording medium used in the present invention, in order to make it possible to conduct recording and detection of information in minute regions and to increase the recording capacity to a practically acceptable level, it is necessary that the easy axis of magnetization of the thin film (recording thin film) for recording be normal to the film surface.

In order to make the easy axis of magnetization of the thin film normal to the film surface, it is necessary that the thin film has sufficient magnetic anisotropy. Magnetic anisotropy is accomplished by constituting the thin film by an amorphous material. In the present invention, the material suitable as the amorphous material is referred to as the amorphous rare-earth transition metal alloy. The amorphous rare-earth transition metal alloy may be a Gd-Co alloy, a Gd-Fe alloy, a Tb-Fe alloy, a Gd-Tb-Fe alloy, or a Tb-Fe-Co alloy, or one of alloys obtained by adding Bi, Sn, Ge or the like to these alloys.

By "hard supporting disk" is meant a light-permeable material exhibiting a hardness sufficient to support the magneto-optical recording medium and shaped to match the disk-like shape of the magneto-optical disk memory. The hard supporting disk may be fabricated of glass or a non-flexible plastic material, for example, PMMA.

By "grooved disk" is meant a hard supporting disk provided with grooves formed on the surface closely contacted with the magneto-optical recording medium so that the grooves correspond to the grooves for recording (tracks) which should be formed on the magneto-optical recording medium.

By the term "reflecting metal film" as used herein is meant a reflective film constituted by a metal such as aluminum, gold, silver, or titanium, or an alloy of these metals.

The magneto-optical recording medium used in the present invention may be fabricated by overlaying an amorphous rare-earch transition metal alloy on a flexible substrate supported at a sufficient tension at a temperature in the range of room temperature or lower by a sputtering process or a vacuum deposition process. Film forming may be conducted in the same manner also when a reflecting metal film is positioned between the substrate and the amorphous alloy thin film.

The magneto-optical disk memory in accordance with the present invention is obtained by sandwiching the magneto-optical recording medium obtained as described above between hard supporting disks. In the case where grooved supporting disks are used and grooves are formed on the recording medium, in order to improve flexibility of the recording medium, the thickness of the recording medium should preferably be 20 μm or less and the recording medium should be sandwiched by the grooved supporting disks by a vacuum press-fitting process. In other cases, any other method may be used to closely contact the supporting disks with the recording medium insofar as the recording medium is supported therebetween so that no problem arises with regard to operations of the magneto-optical disk memory.

In the present invention, the magneto-optical disk memory is fabricated of the magneto-optical recording medium comprising the flexible substrate, and the hard supporting disks. Therefore, unlike the conventional magneto-optical disk memory obtained by overlaying a thin film on hard disks one by one, the magneto-optical disk memory of the present invention is suitable for mass production.

Further, since the substrate of the magneto-optical recording medium used in the present invention is flexible, the magneto-optical recording medium can be shaped easily to match a desired shape of the magneto-optical disk memory. Accordingly, the magneto-optical disk memory of the present invention can be formed into various shapes without adversely affecting the productivity. Particularly, the grooved type magneto-optical disk memory can be fabricated very easily by press-fitting the magneto-optical recording medium comprising a thin substrate to grooved supporting disks in a vacuum.

The magneto-optical disk memory comprising the reflecting metal film between the substrate and the recording thin film of the magneto-optical recording medium exhibits magneto-optical characterisitics superior to those of the conventional magneto-optical disk memory.

BRIEF DESCRIPTION OF THE DRAWINGS

FIG. 1 is a sectional side view showing an embodiment of the magneto-optical disk memory in accordance with the present invention, and FIG. 2 is a sectional side view showing another embodiment of the magneto-optical disk memory in accordance with the present invention.

DESCRIPTION OF THE PREFERRED EMBODIMENTS

The present invention will hereinbelow be described in further detail with reference to the accompanying drawings.

Referring to FIG. 1, a magneto-optical disk memory 1 comprises a magneto-optical recording medium 2 fabricated by overlaying a reflecting metal film 2B and a recording thin film 2C on a flexible substrate 2A. Hard supporting disks 3A and 3B are closely contacted with the front and back surfaces of the magneto-optical recording medium 2. Information is recorded in the recording thin film 2C by a thermo-magnetic means, and is detected by exposing the recording thin film 2C to a light beam 4 and by utilizing a magneto-optical effect such as the magneto-optical Kerr effect or the Faraday effect.

FIG. 2 shows another embodiment of the magneto-optical disk memory in accordance with the present invention. A grooved type magneto-optical disk memory 11 comprises a magneto-optical recording medium 12 fabricated by overlaying a recording thin film 12C on a flexible substrate 12A, and grooved hard supporting disks 13A and 13B press-fitted to the magneto-optical recording medium 12 in a vacuum. Information is recorded in the magneto-optical disk memory 11 in the same manner as described with reference to FIG. 1, and is detected by exposure to a light beam 14.

It should be understood that the present invention can be embodied in various types other than the above described embodiments. For instance, it is possible to omit the reflecting metal film 2B in the magneto-optical disk memory 1 of FIG. 1. It is also possible to position a reflecting metal film between the flexible substrate 12A and the recording thin film 12C in the magneto-optical disk memory 11 of FIG. 2.

Also, it is possible to position a substrate treatment layer, a dielectric layer and/or a protective layer between the substrate and the recording thin film, and/or between the recording thin film and the supporting disk.

It is also possible to overlay the recording thin film on both surfaces of the substrate.

We claim:
1. A magneto-optical disk memory comprising:
    (i) a magneto-optical recording medium comprising a flexible substrate, and a recording thin film overlaid on said substrate, said recording thin film being constituted by an amorphous rare-earth transition metal alloy having the easy axis of magnetization normal to the film surface, and
    (ii) two hard supporting disks each contacted closely with the front surface and the back surface of said magneto-optical recording medium wherein the thickness of said substrate is 20 microns or less, and said hard supporting disks are grooved disks and are press-fitted to said magneto-optical recording medium in a vacuum.
2. A magneto-optical disk memory as defined in claim 1 wherein said substrate is constituted by a flexible material exhibiting a glass transition temperature of 70° C. or higher.
3. A magneto-optical disk memory comprising:
    (i) a magneto-optical recording medium comprising a flexible substrate, a reflecting metal film overlaid on said substrate, and a recording thin film overlaid on said reflecting metal film, said recording thin film being constituted by an amorphous rare-earth transition metal alloy having the easily magnetizable axis normal to the film surface, and
    (ii) two hard supporting disks each contacted closely with the front surface and the back surface of said magneto-optical recording medium wherein the thickness of said substrate is 20 microns or less, and said hard supporting disks are grooved disks and are press-fitted to said magneto-optical recording medium in a vacuum.
4. A magneto-optical disk memory as defined in claim 3 wherein said substrate is constituted by a flexible material exhibiting a glass transition temperature of 70° C. or higher.

* * * * *